United States Patent
Riise et al.

(10) Patent No.: US 7,606,581 B2
(45) Date of Patent: Oct. 20, 2009

(54) SYSTEM AND METHOD FOR PROVIDING GEO-RELEVANT INFORMATION BASED ON A LOCATION

(75) Inventors: Sorren Riise, London (GB); Dev Patel, London (GB)

(73) Assignee: Yahoo! Inc., Sunnyvale, CA (US)

( * ) Notice: Subject to any disclaimer, the term of this patent is extended or adjusted under 35 U.S.C. 154(b) by 447 days.

(21) Appl. No.: 11/314,155

(22) Filed: Dec. 13, 2005

(65) Prior Publication Data

US 2007/0135991 A1 Jun. 14, 2007

(51) Int. Cl.
*H04Q 7/20* (2006.01)
(52) U.S. Cl. .................... 455/456.1; 455/446
(58) Field of Classification Search ........ None
See application file for complete search history.

(56) References Cited

U.S. PATENT DOCUMENTS

| | | | |
|---|---|---|---|
| 6,009,403 A | 12/1999 | Sato | |
| 6,452,498 B2 | 9/2002 | Stewart | |
| 6,529,824 B1 | 3/2003 | Obradovich et al. | 701/208 |
| 6,650,998 B1 | 11/2003 | Rutledge et al. | |
| 6,691,114 B1 | 2/2004 | Nakamura | |
| 6,714,664 B2 | 3/2004 | Abe et al. | |
| 7,203,598 B1 | 4/2007 | Whitsell | 701/210 |
| 2002/0000999 A1 | 1/2002 | McCarty et al. | |
| 2002/0002552 A1 | 1/2002 | Schultz et al. | |
| 2002/0143462 A1* | 10/2002 | Warren | 701/200 |
| 2002/0156779 A1 | 10/2002 | Elliott et al. | |
| 2003/0083073 A1* | 5/2003 | Cossins et al. | 455/446 |
| 2003/0165254 A1 | 9/2003 | Chen et al. | |
| 2004/0073538 A1 | 4/2004 | Leishman et al. | |
| 2006/0069504 A1* | 3/2006 | Bradley et al. | 701/211 |

(Continued)

FOREIGN PATENT DOCUMENTS

CN  1275749 A  12/2000

(Continued)

OTHER PUBLICATIONS

Schiller, J. et al., "Location Based Services—Chapter 3—Navigation Systems: A Spatial Database Perspective" Morgan Kaufmann, XP002406375, Section "3.6.1 Point Query (PQ)," 2004.

(Continued)

*Primary Examiner*—Lester Kincaid
*Assistant Examiner*—Phuoc Doan
(74) *Attorney, Agent, or Firm*—Brinks Hofer Gilson & Lione

(57) ABSTRACT

A method is disclosed of providing geo-relevant information based on a location. A data item is received, the data item originating from a geographic location and comprising at least one component characterized by the geographic location. The data item is geo-coded, wherein the geo-coding includes identifying the at least one component; associating the identified at least one component with a geographic region; determining at least one group of at least two points corresponding to the geographic region, the at least one group of at least two points defining a plane enclosing the geographic region; and augmenting the data item with data representative of the determined at least one group of at least two points defining a plane. Relevant information is determined based on the augmented data item. The relevant is provided information to a user.

19 Claims, 8 Drawing Sheets

U.S. PATENT DOCUMENTS

| | | | |
|---|---|---|---|
| 2007/0135992 A1 | 6/2007 | Riise et al. | 455/456.1 |
| 2007/0135993 A1 | 6/2007 | Riise et al. | 455/456.1 |
| 2007/0146374 A1 | 6/2007 | Riise et al. | 455/456.1 |
| 2007/0150199 A1 | 6/2007 | Riise et al. | 703/5 |

FOREIGN PATENT DOCUMENTS

| | | |
|---|---|---|
| EP | 1 072 987 A1 | 1/2001 |
| JP | 9-330329 A | 12/1997 |
| JP | 10-162031 A | 6/1998 |
| JP | 11-174951 A | 7/1999 |
| JP | 2001-5764 A | 1/2001 |
| JP | 2001-22767 A | 1/2001 |
| WO | WO 00/41090 A1 | 7/2000 |
| WO | WO 00/41091 A1 | 7/2000 |

OTHER PUBLICATIONS

Rees, T., "C-Squares, a New Spatial Indexing System and its Applicability to the Description of Oceanographic Datasets," Oceanography, vol. 16, No. 1, XP002340570, pp. 11-19, Mar. 2003.

Govindarajan, et al., "Geo Viser. Geographic Visualization of Search Engine Results," Database and Expert Systems Applications, 1999. Proceedings. Tenth Int'l Workshop on Floence, Italy Sep. 1-3, 1999, Los Alamitos, CA, USA, IEEE Comut. Soc, US, p. 269-273, Sep. 1, 1999.

"Method for Generating Location-Specific Internet Application Content," Research Disclosure, Kenneth Mason Publications, Hampshire, GB, No. 425, p. 1197, Sep. 1999.

PCT International Search Report for International Application No. PCT/US2006/027848 dated Nov. 28, 2006.

Written Opinion of the International Searching Authority for International Application No. PCT/US2006/027848 dated Nov. 28, 2006.

* cited by examiner

SYSTEM AND METHOD FOR PROVIDING GEO-RELEVANT INFORMATION BASED ON A LOCATION

TECHNICAL FIELD

The present embodiments relate generally to geo-coding, and more particularly, but not exclusively, to geo-coding based on spatial geometry.

BACKGROUND

Geo-coding enables enterprises to apply geographic coordinates to named entities, such as place names, street addresses or other entities associated with a specific physical location. Geo-coding may provide an important source of revenue for e-commerce enterprises, such as Internet based search engines, advertisers, etc. E-commerce enterprises provide results to a user based on the user's entered query terms or other relevant information. In this regard, such enterprises may provide advertising and other information or content to the user.

For example, a user may conduct an on-line search for a coffee shop in San Francisco. In response thereto, advertisements may be displayed to the user for advertisers having coffee shops or other related businesses located near the location queried by the user. Often, however, relevant advertisements are not displayed even though the advertiser's business is relevant and located near the location queried by the user. Further, advertisements may be displayed even though the business is irrelevant or the advertiser does not actually serve the location queried by the user. Accordingly, a user may be presented with irrelevant or useless advertisements while relevant and useful advertisements fail to be displayed.

Accordingly, there is a need for a system and method for more accurately identifying relevant and useful advertisements or other information/content for presentation to a user based on geographical relevance.

SUMMARY

By way of introduction, the embodiments described below include a system and method for geo-coding based on spatial geometry. The embodiments relate to spatial geometry based on polygons which represent geographic features. The embodiments further relate to minimum bounding rectangles which contain the polygons. In one embodiment, information, advertisements and media may be determined geographically relevant, either locally, nationally or internationally, and may be displayed to a user.

In a first aspect, a method is disclosed of providing geo-relevant information based on a location. A data item is received, the data item originating from a geographic location and comprising at least one component characterized by the geographic location. The data item is geo-coded, wherein the geo-coding includes identifying the at least one component; associating the identified at least one component with a geographic region; determining at least one group of at least two points corresponding to the geographic region, the at least one group of at least two points defining a plane enclosing the geographic region; and augmenting the data item with data representative of the determined at least one group of at least two points defining a plane. Relevant information is determined based on the augmented data item. The relevant is provided information to a user.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

DETAILED DESCRIPTION

The disclosed embodiments relate generally to geo-coding, and more particularly, but not exclusively, to geo-coding based on spatial geometry. The principles described herein may be embodied in many different forms. The systems and methods may allow search engines, advertisers or other e-commerce entities to provide users with geographically relevant information based on the user's search query or other information directly or indirectly provided by the user which has geographic relevance. The disclosed systems and methods may allow search engines to match users with geographically relevant advertising and media. The systems and methods may allow businesses to target users with geographically relevant advertisements and media. Further, the disclosed systems and methods minimize the amount of processing necessary to analyze geographic relevance and determine geographic relationships by minimizing the number of potential hierarchical and adjacent relationships of a given geographic region that must be processed to identify geographically relevant data.

To clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superceding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

Figure 1:
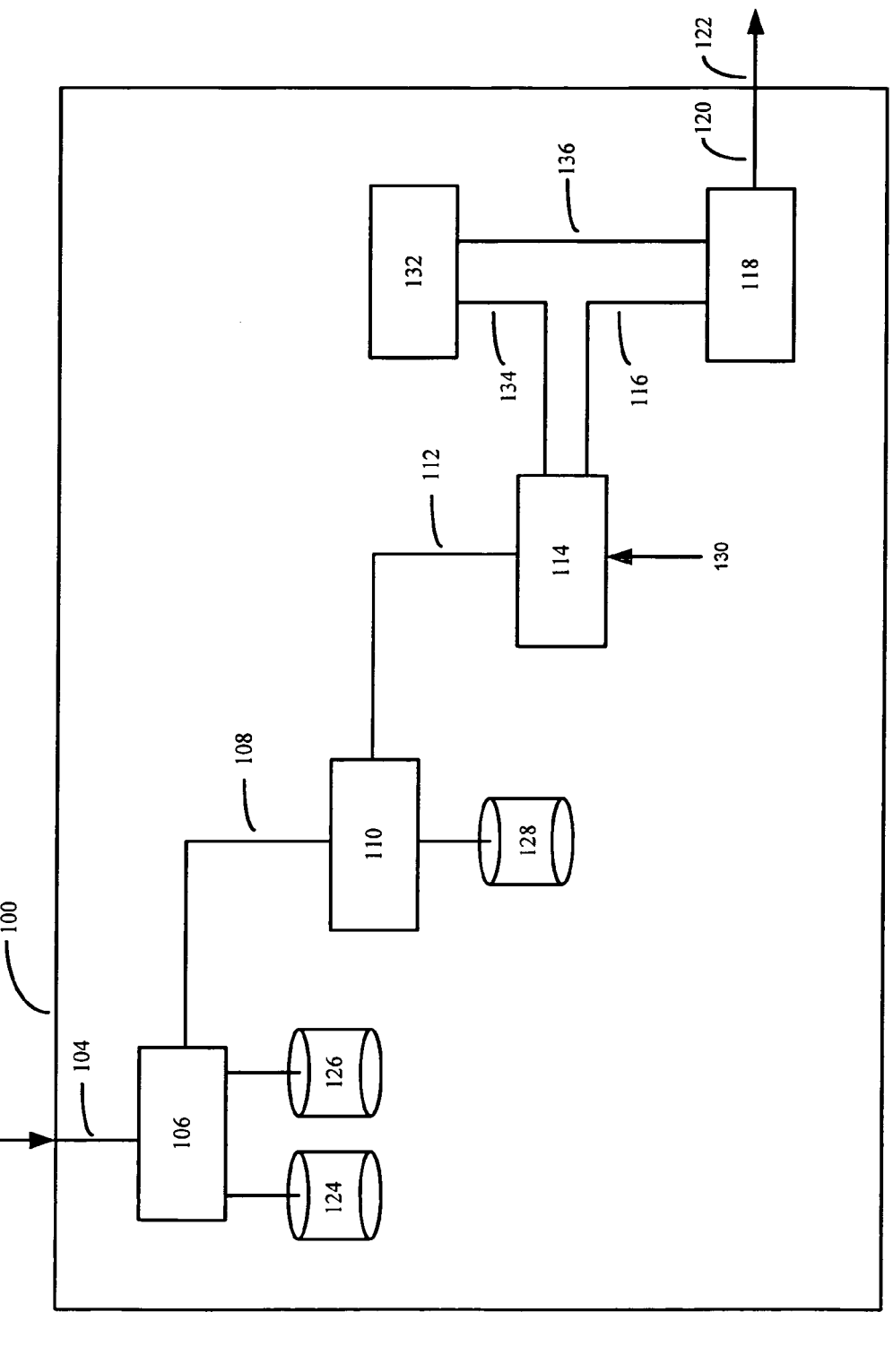
FIG. 1 is a block diagram of one embodiment of a geo-coding system.

FIG. 1 shows a system 100 for geo-coding using spatial geometry according to one embodiment. The system 100 includes an identifying processor 106, an associating processor 110 coupled with the identifying processor 106, a determining processor 114 coupled with the associating processor 110, and augmenting processor 118 coupled with the determining processor 114. Herein, the phrase "coupled with" is defined to mean directly connected to or indirectly connected through one or more intermediate components. Such intermediate components may include both hardware and software based components.

The system 100 receives an input 102 corresponding to a data item 104. The data item 104 is then input into an identifying processor 106. The identifying processor 106 identifies the components 108 of the data item 104. The components 108 of the data item 104 are then input into an associating processor 110. The associating processor 110 associates the identified components 108 with a geographic region 112. The associated geographic regions 112 are then input into a determining processor 114. In one embodiment, the determining processor 114 determines at least two points 116 that correspond to the geographic region 112. The two points 116 define a closed plane in which the geographic region lies. The two points 116 are then input into an augmenting processor 118. The augmenting processor 118 augments the data item with data representative of the closed plane in which geographic region lies. The augmented data item 120 is then output from the system 100 as shown by the output 122 to be stored in a geo-coded database or utilized to identify relevant data in a geo-coded database, as the implementation dictates. Each of these processors is described below, along with its corresponding inputs and outputs.

It will be appreciated that each of the identifying processor.106, associating processor 110, determining processor 114 and augmenting processor 118 may be implemented in software, hardware or a combination thereof and that one or more of the identifying processor 106, associating processor 110, determining processor 114, and augmenting processor 118 may be integrated together or further sub-divided into additional discrete components. All such logical and physical implementations of the described functionality are contemplated herein.

The input 102 of the system 100 includes a data item 104. The data item 104 may be a web page, search query, advertisement, domain address, source tag, or the like. For example, a web page may be input into the system 100 wherein all of the geographically relevant data, or a sub-set thereof, contained within the web page may be geo-coded as described herein.

The data item 104 may be entered into the system 100 either directly or indirectly or via a combination of direct and indirect means. The data item 104 may be entered directly if the data item 104 may be garnered independent of the geographic location of the source of the data item 104. For example, if a user enters a search query into a web browser program, the data item 104 may be the search query or a subset thereof. The data item 104 does not depend on the geographic location of where the search query is entered. Similarly, if a user aurally enters a command into a vehicle navigation system, voice recognition software may convert the aural command to a data item 104 or a subset thereof. The data item 104 does not depend on the geographic location of where the aural command was given. Other examples of directly entering the data item 104 may include algorithms that search web pages, advertisements, domain names, source tags, or the like for geographically relevant data. In each of these cases, the data item 104 does not depend on the geographic location of the web pages, advertisements, domain names, source tags or the like. For directly entered data items 104, the geographic relevance, as determined by the disclosed embodiments, is determined by the contents thereof.

Entering the data item 104 directly into the system 100 may further be manually or automatically entered or via a combination of automated and manual means. A data item 104 may be entered manually where the data item 104 may be physically or aurally entered into the system 100. Examples of manually entering the data item 104 into the system 100 may include a user entering a search query into a web browser program or a user aurally entering a command into a vehicle navigation system. A data item 104 may also be entered automatically where the data item 104 may not be physically or aurally entered into the system 100 by a user but rather sought out or located by the system 100. Examples of automatically entering the data item 104 into the system 100 may include an algorithm searching web pages, advertisements, domain names, source tags, or the like, e.g. a web crawling algorithm.

Alternatively, the data item 104 may be entered indirectly into the system 100. The data item 104 may be entered indirectly, for example, if the data item 104 depends on the geographic location of the source of the data item 104. For example, a chip such as a radio frequency identification device, smart card, credit card or the like, router or other communications device, processor such as a personal digital assistant, cellular telephone or other personal computing device or any other electronic device may provide data which may dynamically or statically identify the location of such device. Once the device is powered, accessed, logged into or the like, the data item 104 is garnered from the geographic location of the device. In this regard, the data item 104 is dependent on the geographic location of the source of the data item 104. Other examples may include global positioning devices, cellular triangulation, internet protocol devices, cellular telephone numbers or the like. A device which provides location information may be referred to as being "tagged." It should be noted that a data item 104 may also include an aggregation of multiple separate pieces of data, entered or located separately over a period of time, from different locations, or combinations thereof.

Each data item 104 includes one or more components 108. The data item 104 can include a single component 108 or the data item 104 can contain several components 108. After the data item 104 is received by the system 100, the data item 104 is input into an identifying processor 106 which identifies the components 108 thereof.

Figure 2:
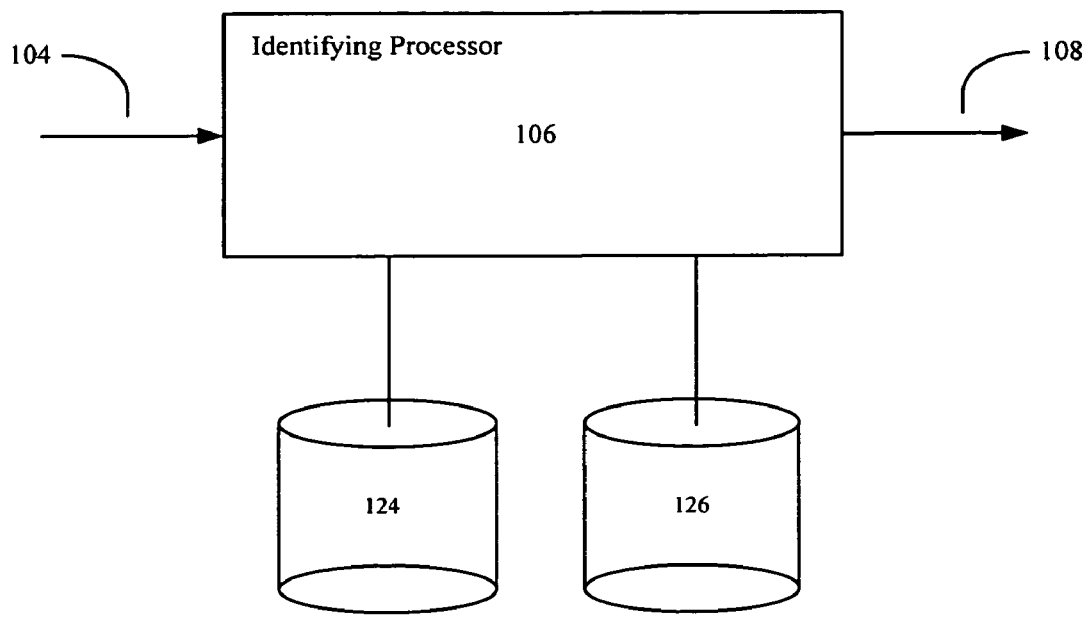
FIG. 2 is a diagram of one embodiment of an identifying processor for use in the geo-coding system of FIG. 1.

FIG. 2 shows an exemplary identifying processor 106 for use in the geo-coding system 100 shown in FIG. 1. The identifying processor 106 identifies the components 108 found in the data item 104. The data item 104 may be either structured data or unstructured data. Structured data refers to data characterized by a data type, e.g. a definition, meaning or context known to the system 100, such as known address terms. The known address terms may be street names, city names, zip codes, county names, country names, or other like address terms. Unstructured data refers to data having no definition, meaning or context, such as general alphanumeric data including letters, numbers or symbols or any combination of letters, numbers or symbols. The identifying processor 106 parses the data item 104 and determines the components 108 thereof that have geographical relevance. In one embodiment, the identification processor serially processes the contents of the data item 104 and parses the components 108 thereof as they are encountered. In an alternate embodiment, the identification processor 106 may process all of the contents of the data item 104, or subsets thereof, in parallel. In yet another alternative embodiment, the data item 104 may be fit to a template which aids the identification processor 106 in parsing the components 108.

For structured data, databases may be provided, coupled with the identification processor 106, which catalog data by data type. For example, a database 124 may be compiled of all the structured data terms and the order in which the terms appear. For example, addresses in the United States have a structure that is different from addresses in Europe. An address in the United States might be Los Angeles, Calif. 90102, whereas an address in Europe might be London EC1A 1BR, England. Not only do these addresses use different components 108, they also structure the components 108 in different ways.

For example, the database 124 of structured data may be compiled from all of the postal structures across the globe. Using this database 124, the identifying processor 106 can detect a particular structure and therefore separate/parse the structured data item 104 into its components 108. For example, if the data item 104 is a United States based web page, the identifying processor 106 identifies that the web page is registered in the United States and finds any data contained within that page that has the structure of a United States postal address, then the system 100 may allocate the identified components 108 of the data item 104 to the various fields known to comprise a US postal address. Accordingly, the identifying processor 106 may separate the data item 104 into its components 108, e.g. street address, city name, state name and zip code. The identifying processor 106 knows that addresses in the United States start with a city name, followed by a state name which is typically a two character abbreviation and end with a six digit zip code.

The identifying processor 106 may also compare the data item 104 to each structure in the database 124. In the above example, if the identifying processor 106 may not identify that the web page is registered in the United States, then the identifying processor 106 may compare the data item 104 to each structure in the database 124 to determine if the structure of the data item 104 matches any of the known postal structures. If a match occurs, the identifying processor 106 may separate the data item 104 into its components.

Referring to the example above, the identifying processor 106 may separate Los Angeles, Calif. 90102 into the components: "Los Angeles," "Calif." and "90102". The same may be done with the European address. The same may also be done with any other addresses that have postal code systems from which to compile the structured data database 124.

In the case of unstructured data, the data item 104 may simply include arbitrary text, symbols or other inputs. Examples of unstructured data could be a page of text, press release, news article, or a query search. In the case of unstructured data, there may be no database of structures in which to compare the unstructured data. In this case, the identification processor 106 includes algorithms that identify clues used to determine the components 108 that have geographical relevance. One example of these algorithms is searching the data item 104 for clue words such as "in," "near" or "around." For example, if "near Yankee Stadium" is found in the data item 104, the probability is high that "Yankee Stadium" has geographical relevance. Thus, the identifying processor 106 will return "Yankee Stadium" as a component 108. Another example is algorithms that compare the data item 104 to city name or zip code databases. When a match occurs, a city name or zip code is identified as a component 108. Several other algorithms may be used for identifying the components 108 of unstructured data. Further, dictionary, thesaurus, atlas, etc. look-ups may be utilized to contextualize the unstructured data item 104 and aid in parsing the components 108 thereof. In such cases, databases 126 of unstructured data may be provided, coupled with the identified processor 106, which catalog the dictionary, thesaurus, atlas, etc. look-up data.

The components 108 having geographical relevance may also be identified by comparing the data item 104 to a database (not shown) of previously geo-coded components 108. This database (not shown) may be the same database as the geographic database 128, which is discussed below, or a separate database coupled to the identifying processor 106. The previously geo-coded components 108 have already been determined to be geographically relevant. Thus, when a match occurs, the components 108 of the present data item 104 may be identified as geographically relevant.

In one embodiment, the identifying processor 106 identifies the components 108 automatically upon receiving a data item 104 as input. Alternatively, or in combination therewith, the identifying processor 106 may receive manual identification of components. For example, when a user manually enters a search query, the query may offer geographic regions to be selected. Or, the query may require or recommend that a geographic term be entered. The query may alternatively be structured, such as by providing fields, pull down menus, or other structured data entry elements, for particular data, such as an address or city field. These manually selected geographic regions or manually entered geographic terms may be received as components 108 by the identifying processor 106, having a defined context. In another example, the entered text may be scanned in real time. When a geographically relevant term is recognized by the methods described above, the query can suggest other geographically relevant terms or points of interests which may also be provided to the identifying processor 106 as components 108.

In an alternative embodiment, the process of improving the quality of parsing a data item 104 into its components 108 may be improved by adding processing rules to remove ambiguities in the data item 104 or the components 108 thereof. For example, one such rule could be that each address can only contain one zip code, one state name and one country name.

Figure 3:
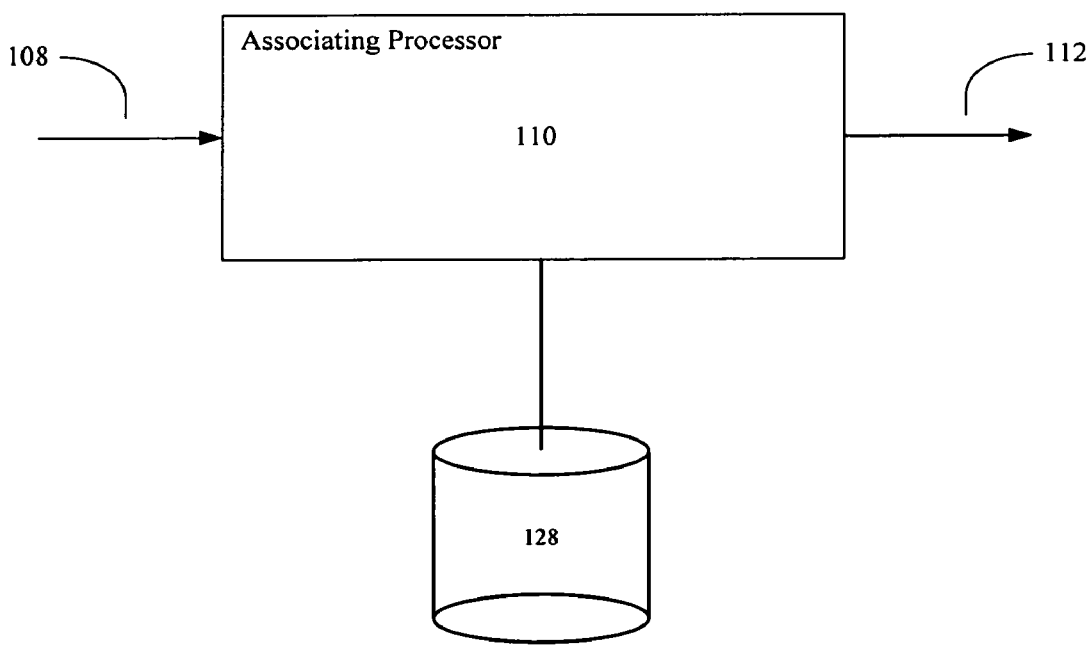
FIG. 3 is a diagram of one embodiment of an associating processor for use in the geo-coding system of FIG. 1.

After the components 108 have been identified, or as they are identified, the components 108 are input into the associating processor 110, one embodiment of which is shown in FIG. 3. In one embodiment, the associating processor 110 associates the components 108 with one or more geographic regions 112. Each component 108 may be associated with a single geographic region or a plurality of geographic regions.

Associating the components 108 with a geographic region 112 may be accomplished by comparing the components 108 to a geographic database 128. In one embodiment, the geographic database 128 may be structured based on spatial geometry, wherein geometric shapes, such as polygons, are constructed to represent all of the geographic regions of a given area, such as the Earth. In this embodiment, these polygons may be created by digitizing physical map boundaries, demographic boundaries, geological boundaries, governmental/administrative boundaries, by latitude/longitude coordinates, or combinations thereof. Alternatively, boundaries may be arbitrarily defined by a user.

Figure 4:
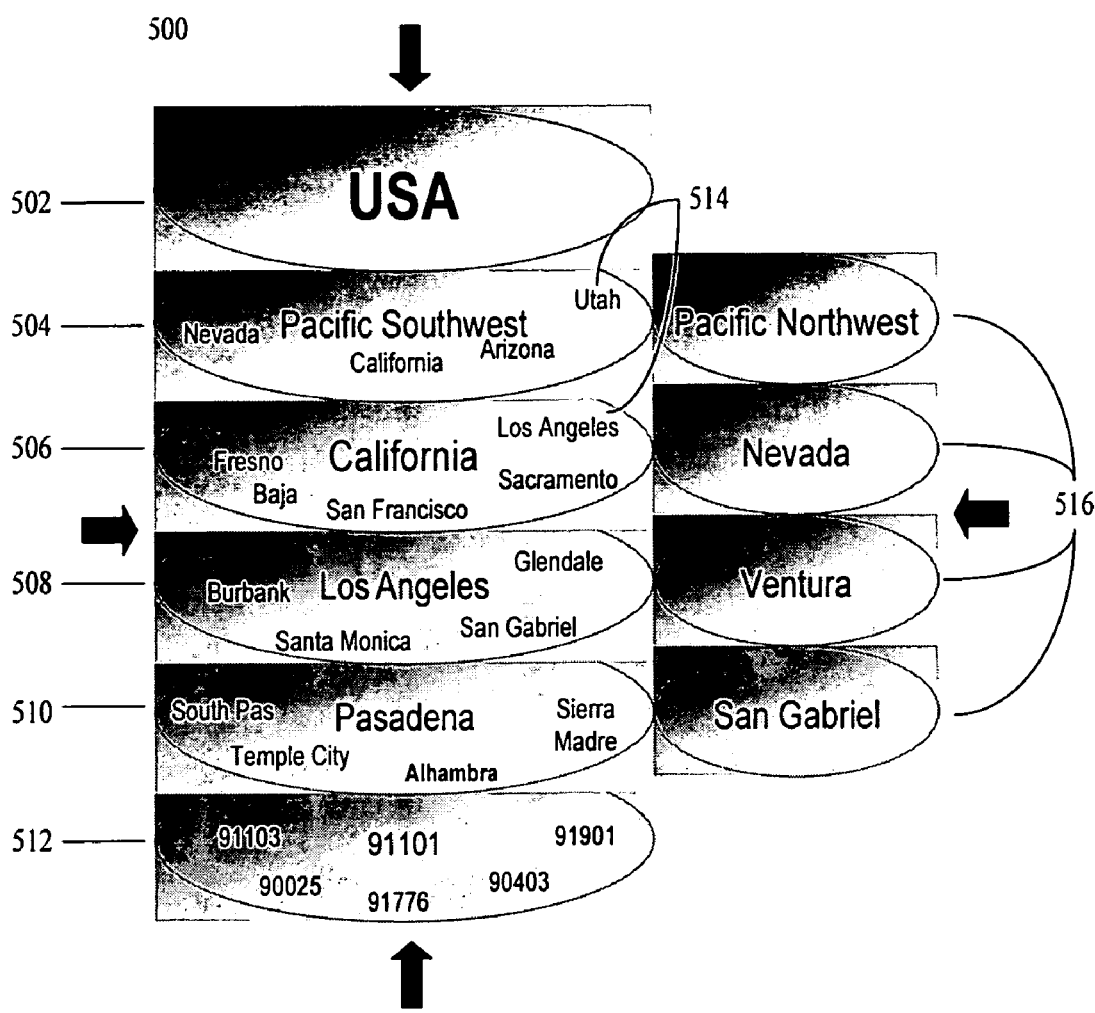
FIG. 4 is an illustration of one embodiment of a hierarchy structure for use in the geographical database of the geo-coding system of FIG. 1.

The geographic database 128 may be designed based on a hierarchical structure. The database stores geographic data vertically and horizontally. Vertical relationships may be referred to as parent/child relationships and horizontal relationships may be referred to as adjacencies or proximities. FIG. 4 shows a representation of an exemplary hierarchy structure 500 of the database. In the exemplary hierarchy, the vertical structure may be broken up into national 502, super-region 504, state 506, designated market area 508, city 510 and postal code 512. Other combinations of geographic regions may be used. Within these geographic regions, smaller geographic regions 514 may be contained. The horizontal structure may also be shown by the adjacent geographic regions 516 proximate geographic regions (not shown) determined by a specified proximity. Besides first level adjacencies, other levels may also be used to associate with regions separated by one or more intervening regions. A similar hierarchy structure may be created for Europe and the rest of the globe.

In order to create the hierarchical structure, minimum bounding rectangles or other polygons may be constructed to enclose one or more polygons. The minimum bounding rectangles or polygons may be an efficient way to determine the parent/child and adjacency relationships. A given polygon may be constructed with millions of connecting sides. The more connecting sides a polygon consists of, the more processing it takes to determine the adjacent, overlapping, proximate and hierarchical (where one region is within or encompasses another) relationships with other polygons defining other regions. In one embodiment, only two points, defining a closed plane in which the geographic region lies, need to be analyzed to determine the existence of adjacent, overlapping, proximate or hierarchical relationships. The two points are referred to herein as a "minimum bounding rectangle." It will be appreciated that the number of points utilized are the minimum needed to bound the polygon representative of the particular geographic region, i.e. define a closed boundary with a minimum number of sides, balanced against the desired accuracy of the determination of adjacent, overlapping, proximate or hierarchical relationships and the processing capability needed to perform such a determination. While the disclosed embodiments refer to minimum bounding rectangles defined by two points, it will be appreciated that other minimally bounding polygons defined by more than two points may also be used.

The two points used to construct the minimum bounding rectangle may be the maximum and minimum X, Y coordinates of the polygon. The upper right point of the minimum bounding rectangle may correspond to the maximum X and maximum Y coordinates of the polygon. Similarly, the lower left point may correspond to the minimum X and minimum Y coordinates of the polygon. The lower right point and upper left point may also be used to construct the minimum bounding rectangle. As will be discussed, the determination of adjacent, overlapping, proximate or hierarchical relationships may be based on computations utilizing these coordinates of the bounding points.

In one embodiment, the associating processor 110 associates the components 108 with geographic regions 112 automatically upon receiving the components 108 as input. Alternatively, or in combination therewith, the associating processor 110 may receive manual association of the components 108 with the geographic regions 112. For example, an advertiser may manually enter desired advertising regions to be associated with their advertisement, such as by specifying a desired geographic region, e.g. state, city, zip code, arbitrary boundary or combinations thereof. Each geographic region is represented by a polygon and a minimum bounding rectangle. The polygon and minimum bounding rectangle are associated with unique identifiers. An advertiser may use these identifiers to manually enter which geographic regions the advertiser is interested in. For example, if the polygon and minimum bounding rectangle representing Los Angeles is identified by 29, then the advertiser simply enters 29 into the system 100. The advertiser may also manually create its own geographic regions which the associating processor 110 receives.

Polygons may also be defined using a plurality of polygons within the database. For example, an advertiser may have franchises located all over the United States that may be defined by zip codes. The zip codes may be used to define a franchise polygon that incorporates all the zip codes. The franchise polygon may then be stored in the geographic database 128.

As previously stated, the polygons in the geographic database 128 may be given unique identifiers. The identifiers may be used to disambiguate one polygon from another. Accordingly, the polygons representing the geographic region defined by an area code, zip code or suburb region may be disambiguated, even though each region may have the same latitude/longitude coordinates within a given tolerance, i.e. may be hierarchically related. Traditional geo-coding methods may identify the area code, zip code and suburb region as the same region as a result of the identical latitude/longitude coordinates. Because the polygons may be given unique identifiers independent of the latitude/longitude coordinates, the uniquely identified polygons do not suffer from the same traditional geo-coding drawback. Further, in order to keep the identifiers unique, outdated identifiers may be retired and replaced with new. For example, if a zip code gets broken up into two zip codes, the original identifier may be retired and two new identifiers may be assigned to the polygons representing the two zip codes.

The unique identifiers may also be used to disambiguate two or more polygons that represent geographic regions that are defined by the same or similar names. For, example, the identifiers may be used to disambiguate the polygons representing the regions. defined by Pasadena, Calif. and Pasadena, Tex. In the geographic database 128, the identifiers may be associated with characteristics and attributes of the geographic region that the corresponding polygon encloses. As a result, the polygon representing the geographic region defined by Pasadena, Calif. may be given an identifier, which may be associated with characteristics, such as the city name, state name and country name. The polygon representing Pasadena, Tex. may be defined in the same way. Thus, when searching for Pasadena, the identifying processor 106 may recognize that there are two distinct Pasadena locations from the distinct identifiers. The identifying processor 106 may also know that one Pasadena may be found in California and the other in Texas, by associating the identifier with the other characteristics. Accordingly, the associating processor 110 may use algorithms to identify clues to disambiguate the two. For example, if the user's IP address is located in California, then the probability is high that the user intends Pasadena, Calif. and not Pasadena, Tex. Or, if the user is searching for "Manchester" and the user is searching from a United Kingdom registered web site, the probability is high that the user intends Manchester, England, not Manchester, Conn. Other algorithms may be used to disambiguate two locations. In one embodiment, natural language algorithms may be employed such as those disclosed in U.S. patent application Ser. Nos. 11/314,166 and 11/314,956 entitled "System for Classifying Words" and "System. for Determining Probable Meanings of Inputted Words", respectively, filed on the same day as the present application and incorporated by reference herein.

The identifiers may also be used to find parent/child (hierarchical), proximate and adjacency relationships in the geographic database 128. For example, if the polygon identifier to Pasadena, Calif. is 34 then the associating processor 110 may look vertically to find all the parent and child regions that enclose Pasadena, such as California and the United States, or found within Pasadena, such as zip code 91101. The associating processor 110 may also look horizontally to find all the geographical regions that are adjacent or proximate to Pasadena, Calif. Altadena, Calif. which is adjacent to Pasadena might have a polygon identifier of 35 and the other adjacent regions might be identified as 31, 32 and 36. The associating processor 110 may also look horizontally for second or third level adjacencies. An exemplary hierarchy structure 500 of the geographic database 128 illustrating the parent/child and adjacency relationships is shown in FIG. 4.

The geographic regions that define the polygons may, in turn, be defined by many different characteristics. The characteristics may include administrative boundaries which include, but are not limited to, zip codes, governmental borders, area codes or congressional districts. The governmental borders may include, but are not limited to, county, state, city or country, school district, zoning designations. The characteristics may include geographic boundaries which include, but are not limited to, geographic coordinates, geographic features or arbitrarily defined geographic boundaries, such as colloquial names or tourist areas. The geographic coordinates may include, but are not limited to, latitude/longitude coordinates or physical map boundaries. The geographic features may include, but are not limited to, lakes, rivers, oceans or mountains. The characteristics may include demographic boundaries which may include, but are not limited to, income levels, gender, race or spending habits.

Along with defining the polygons by a variety of different characteristics, the polygons may be associated with attributes of the geographic region. The attributes may include demographic attributes which include, but are not limited to, average income, population, congressional representative, city names, street names, zip codes, resident identifiers, business identifiers or governmental entities. The city names, street names and zip codes may be entirely within, partially within or adjacent to the polygon. The resident identifiers may include, but are not limited to, names or addresses. The business identifiers may include, but are not limited to, names, addresses or type or classification. The governmental entities may include, but are not limited to, fire departments, police departments or administrative agencies. The attributes may include geographic, meteorological or geological attributes which include, but are not limited to, elevation, average rainfall or topography.

From the above identifier, characteristic and attribute information, the geographic database 128 may be compiled. Each geographic entry may contain the text name of the entry, the polygon identifier, the minimum bounding rectangle identifier (alternatively or in addition to, the defining point coordinates), any characteristics defining the geographic region defining the polygon or any attributes associated with the geographic region defining the polygon and/or the latitude/longitude coordinates of the component 108. Thus, if the data item 104 contained Pasadena, the geographic entry for Pasadena may be {Pasadena, 27, 127, city, 150000}. Pasadena corresponds to the text name of the entry, 27 corresponds to the polygon identifier, 127 corresponds to the minimum bounding rectangle identifier, city corresponds to the governmental border and 150000 corresponds to the population of Pasadena. Thus, when Pasadena is entered into the associating processor 110, the above geographical data may be attained. It should be noted that the exact location of a component 108 may be included in the geographic data entry. In this regard, the latitude/longitude coordinates may be contained in the geographic database 128, included with the other geographic data.

For every component 108, the associating processor 110 may search the geographic database 128 for a match. When a match occurs, the associating processor 110 may determine the polygon and/or minimum bounding rectangle identifier found in the geographic entry corresponding to the component 108. From the identifier, the associating processor 110 may associate the component 108 with a geographic region 112. For example, if the component 108 was Pasadena, which had the following geographic entry in the geographic database: {Pasadena, 27, 127, city, 150000}, the associating system may search until it found the text name match of Pasadena. After finding the match, the associating processor 110 may look to the text entry to determine the polygon and/or minimum bounding rectangle identifier. Whatever geographic region 112 defined by the polygon and/or minimum bounding rectangle with that identifier may be the geographic region 112 associated with the Pasadena component 108.

Figure 5:
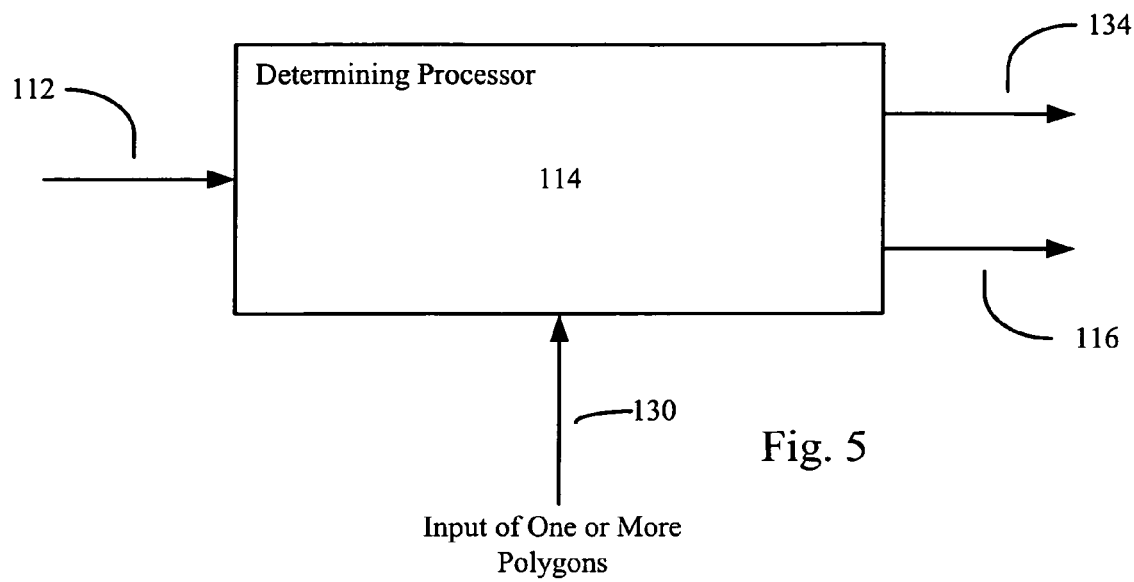
FIG. 5 is a diagram of one embodiment of a determining processor for use in the geo-coding system of FIG. 1.

After the components 108 have been associated with one or more geographic regions 112, or as they are associated, the geographic regions 112 may be input into the determining processor 114, one embodiment of which is shown in FIG. 5. In one embodiment, the determining processor 114 may determine at least two points 116 which correspond to the geographic region 112. The two points 116 may be used to define a plane that encloses the geographic region 112. In a preferred embodiment, the two points may be used to define a plane that encloses the polygon associated with the geographic region 112. In a more preferred embodiment, the two points 116 may define a rectangle that encloses the polygon. In the one embodiment, the two points 116 may define a minimum bounding rectangle that encloses the polygon.

The two points 116 may also define a minimum bounding rectangle that encloses a plurality of polygons. The determining processor 116 may also determine more than two points 116 or a plurality of groups of two points 116, as was discussed above. In the former case, the more than two points 116 may define other geometric shapes to enclose the polygon. The other geometric shapes may include a triangle, pentagon or hexagon, etc. In the latter case, the plurality of groups of two points 116 may be used to define a plurality of minimum bounding rectangles that enclose one or more polygons.

Figure 7:
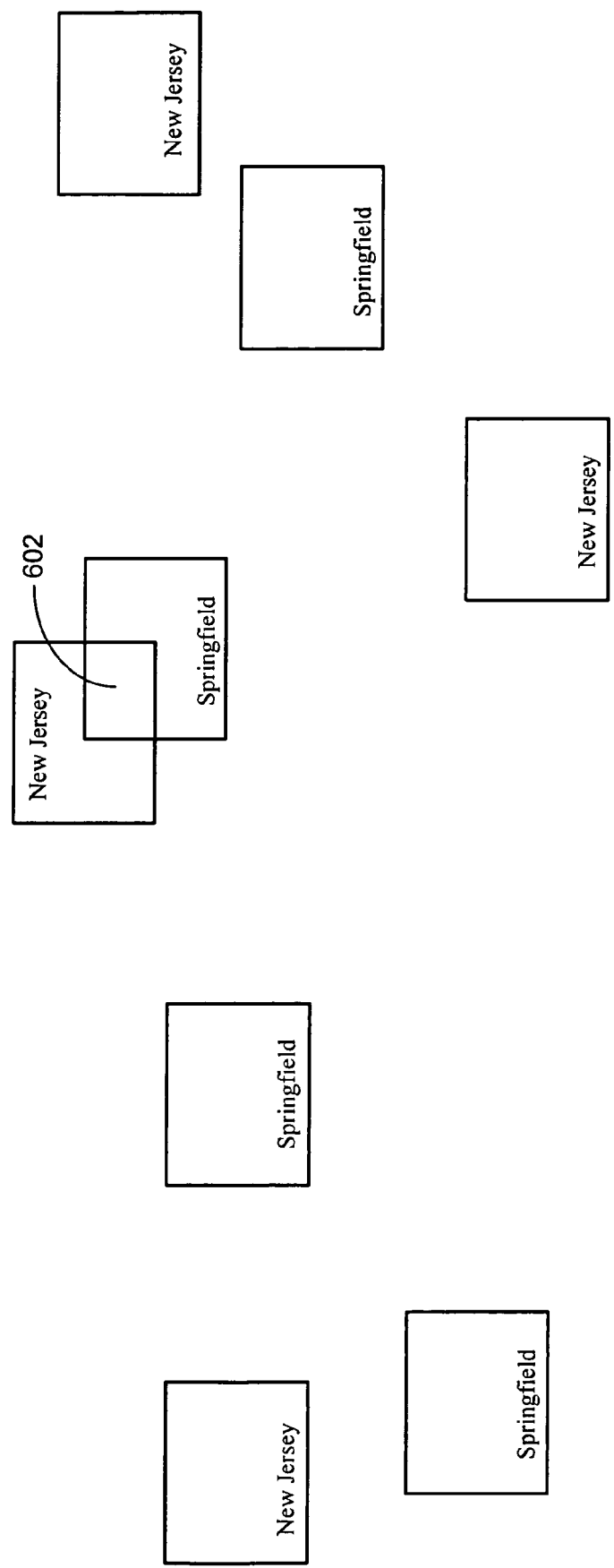
FIG. 7 is a diagram of one embodiment of an overlap relationship between minimum bounding rectangles.

In a first embodiment, the determining processor 116 may determine the two points of an already constructed minimum bounding rectangle stored in the geographic database 128. In this regard, minimum bounding rectangles associated with already geo-coded data items 104 may be analyzed to find a spatial relationship, such as overlapping. As a result, a coordinate location and a minimum bounding rectangle may be correctly applied to a data item 104. For example, the geo-coding of the data item 104 "Springfield, N.J." may easily be determined by the geo-coding system 100. The identifying processor 106 may identify the components 108 of the data item 104 as "Springfield" and "New Jersey." The associating processor 110 will associated each geographic region 112 representing all occurrences of the components 108 "Springfield" and "New Jersey" in the geographic database 128. There are several places named Springfield and several named New Jersey, thus the associating processor 110 may identify several geographic regions 112 associated with the data item 104. The determining processor 114 may determine the minimum bounding rectangle defined by each of the geographic regions 112, as shown in FIG. 7. The minimum bounding rectangles may be analyzed to determine a relationship, such as overlap. The overlap region corresponds to the geo-coding of the data item 104 "Springfield, N.J." The overlap region 602 is also shown in FIG. 7. The augmenting processor 118 may augment the data item 104 with the geographic data representing the overlap region, which will be discussed more below.

It is important to note that where, as shown in FIG. 7, there is only one overlap 602 relationship determined the overlap region may pinpoint exactly which geographic region the user is referring to. In other words, if two or more components 108 result in minimum bounding rectangles that overlap, the probability is high that the user is referring to those two components 108 in the search query. If, however, the user only entered Pasadena, as discussed above, then two relationships may be determined, Pasadena, Calif. and Pasadena, Tex. In this case, the associating processor 110 may use algorithms to search for clues as to which Pasadena the user is referring, which is discussed above.

In a second embodiment, or in combination with the first, the determining processor 116 may construct the minimum bounding rectangles automatically once it receives, or as it is receiving the geographic region 112 as input. In the first embodiment and as introduced above, the minimum bounding rectangles are given unique identifiers. The identifiers may be identical to the polygon in which the minimum bounding rectangle encloses. The identifiers may alternatively be distinct from the polygon in which the minimum bounding rectangle encloses. If the minimum bounding rectangle encloses a plurality of polygons, the minimum bounding rectangle may be given a new identifier or it may be given an identifier dependent on some relationship of the plurality of polygons in which the minimum bounding rectangle encloses. If the minimum bounding rectangle is calculated automatically, the minimum bounding rectangle, along with its identifier, may be temporarily stored to enable calculations to be performed on the minimum bounding rectangle. The minimum bounding rectangle, along with its identifier, may also be stored permanently in the geographic database 128. In this regard, a commonly searched minimum bounding rectangle may not have to be recalculated. Further, in this regard, the geographic database 128 may permanently or temporarily store presently calculated minimum bounding rectangles, as well. as previously calculated minimum bounding rectangles, or combinations thereof.

Rather than calculating automatically, in a second embodiment, or in combination with the first embodiment, the minimum bounding rectangles may be calculated manually. Using the polygons in the geographic database 128, the minimum bounding rectangles may be manually constructed enclosing any combination of polygons. The minimum bounding rectangles may then be temporarily or permanently stored in the geographic database 128.

In a third embodiment, or in combination with the first and second embodiments, the determining processor 110 may construct minimum bounding rectangles when, or as it is receiving a set of polygons. In this regard, the entire system 100 may not be needed. The identifying processor 106 and the associating processor 110 may specifically not be needed. As shown by the input 130 in FIG. 1, the polygons may be input directly into the determining processor 110. The determining processor 110 may then construct minimum bounding rectangles associated with one or more polygons using the methods discussed above.

Also discussed above, the minimum number of points for constructing. a minimum bounding rectangle is two; however, more than two points may be used. The number of points used may directly relate to the desired accuracy of the geometric shape enclosing the polygon. As the number of points increases, the geometric shape more closely resembles the polygon in which the shape is constructed upon. Thus, it will be appreciated that the determining processor 110 may construct minimum bounding rectangles, but it also may construct other geometric shapes enclosing the polygons, as discussed above.

An affiliating processor 130 may be coupled to the determining processor 106. The affiliating processor 130 may affiliate a minimum bounding rectangle with the geographic database 128 to determine its hierarchal relationship within the database 128. The affiliating processor 130 may determine the parent/child and adjacency relationships. The affiliating processor 130 may also assign the one or more minimum bounding rectangles with an identifier and associate the identifier with the hierarchal relationship determined. It will be appreciated that the identifier may be determined according the methods prior discussed. The affiliating processor 130 may then store the one or more minimum bounding rectangles, along with the one or more identifiers and one or more affiliated relationships in the geographic database 128. The affiliating processor 130 may also output the above to the augmenting system 118.

Figure 6:
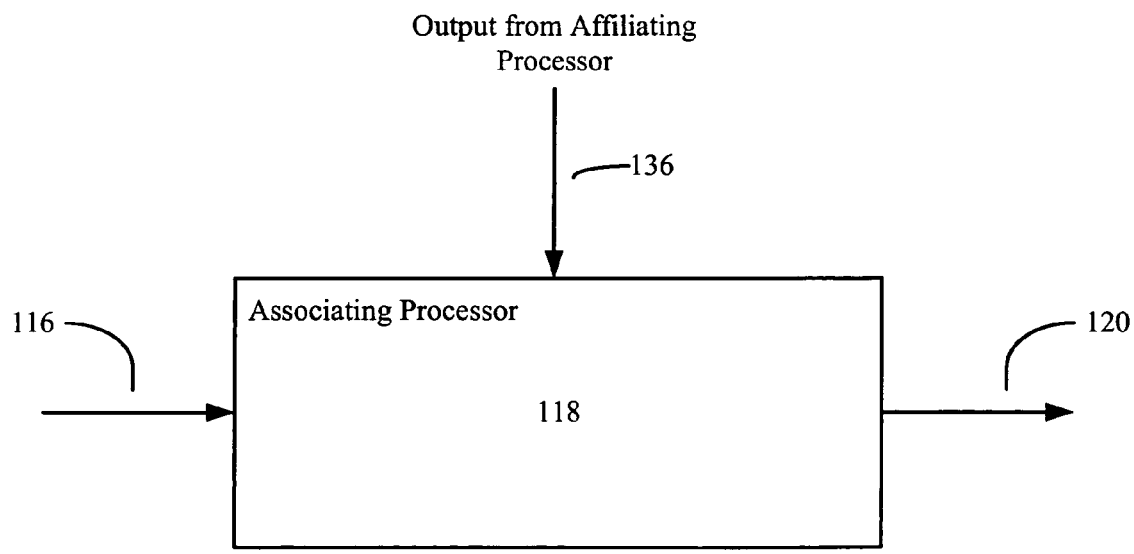
FIG. 6 is a diagram of one embodiment of an augmenting processor for use in the geo-coding system of FIG. 1.

After the minimum bounding rectangles are constructed, or as they are constructed, the minimum bounding rectangles (defined by the two points 116) are input into the augmenting processor 118, one embodiment of which is shown in FIG. 6. In one embodiment, the augmenting processor 118 augments the data item 104 with the data representative of the minimum bounding rectangle. The augmented data item 120 may then be output 122 from the system 100 as shown in FIG. 1.

The data item 104, after passing through the identifying processor 106, the associating processor 110 and the determining processor 114, may be associated with one or more minimum bounding rectangles. For example, the data item 104 may have more than one component 108 that results in multiple minimum bounding rectangles, the data item 104 may also have one component 108 that results in multiple minimum bounding rectangles or the data item 104 may have some combination thereof. In one embodiment, the augmenting system 118 may augment the data item 104 with the geographic data corresponding to a relationship of the multiple minimum bounding rectangles.

For example, the data item 104 may be "Sunnyvale, Calif. 94089." Passing through the system 100, the identifying processor 106 will output "Sunnyvale," "Calif." and "94089" as components 108 of the data item 104. The associating processor 110 will associate each component 108 with one or more geographic regions 112. Each of the geographic regions 112 will be input into the determining processor 114 where a minimum bounding rectangle will be determined for each polygon representing the geographic regions 112. The augmenting processor 118 may augment the data item 104 with the geographic data corresponding to a relationship of the minimum bounding rectangles.

The relationship of the minimum bounding rectangles may include a listing of each minimum bounding rectangle output by the determining processor 114. Alternatively, or in addition thereto, the relationship may be determined to include the area where the determined minimum bounding rectangles overlap. The overlap may be determined by analyzing at least one group of at least two points defining one or more minimum bounding rectangles. With only two points per minimum bounding rectangle, the logic used to calculate overlap between one or more minimum bounding rectangles is simplified. Alternatively, or in addition thereto, the relationship may be determined by which minimum bounding rectangles may be adjacent to the minimum bounding rectangles output by the determining processor 114. Alternatively, or in addition thereto, the relationship may be determined by which minimum bounding rectangle may be the smallest, largest, or other size relation. Further, the relationship may include a combination of the above relationships. The augmenting system 118 augments the geographic data that corresponds to the one or more minimum bounding rectangles corresponding to the determined relationship, such as by adding a data field including the relationships to the data item 104.

In the example above, the exact geo-coding of "Sunnyvale, Calif. 94089" may be determined by two approaches. The first approach is to determine which minimum bounding rectangle of the minimum bounding rectangles that overlap is the smallest. The augmenting processor 118 may then augment the geographic data corresponding to the smallest minimum bounding rectangle to "Sunnyvale, Calif. 94089." The second approach is to determine the area of overlap of the minimum bounding rectangles. The augmenting system 118 may augment "Sunnyvale Calif. 94089" with the geographic data corresponding to the overlap area. Alternatively, a new minimum bounding rectangle may be constructed on the overlapping region. This newly constructed minimum bounding rectangle will be smaller or equal to the smallest of the overlapping minimum bounding rectangles. The augmenting system 118 may output the newly constructed minimum bounding rectangle to the affiliating processor 130. As discussed above, the affiliating processor 130 may affiliate the minimum bounding rectangle with the geographic database 128 to determine hierarchal relationships corresponding to the minimum bounding rectangle. The affiliating processor 130 may store the determined relationships or output back to the augmenting processor 118, also discussed above.

The augmenting system 118 may then augment "Sunnyvale Calif. 94089" with the geographic data corresponding to the new minimum bounding rectangle. It should be noted that as more and more minimum bounding rectangles overlap, the geo-coding of the data item 104 gets more refined. Thus, the overlap relationship may be used to determine the geo-coding of a data item 104 that results in multiple minimum bounding rectangles.

The augmented data item 104 may be stored temporarily or permanently in the geographic database 128. In this regard, the geographic database 128 may store presently or previously geo-coded data items 104, or combinations thereof. The data item 104 may then be compared to other previously geo-coded data items 104 in the geographic database 128 or to newly geo-coded data items 104. The augmenting processor 118 may then augment the data item 104 with the geographic data corresponding to the determined relationship.

The system 100 may also geo-code to the street level. In one embodiment, the streets may be represented spatially using lines and vectors. In this regard, the streets may be stored in the geographic database 128 and searched similar to the systems and methods described herein. In another embodiment, the streets may be represented by minimum bounding rectangles similar the systems and methods described herein. In yet another embodiment, the names of the streets that cross or fall within the minimum bounding rectangles may be indexed as attributed information stored with the minimum bounding rectangles in the geographic database 128. In this regard, when a user searches for a street name, the associating processor 110 may associate what geographic region the street may be located. The system 100 may also geo-code to the street level via a combination of the above embodiments.

Figure 8:
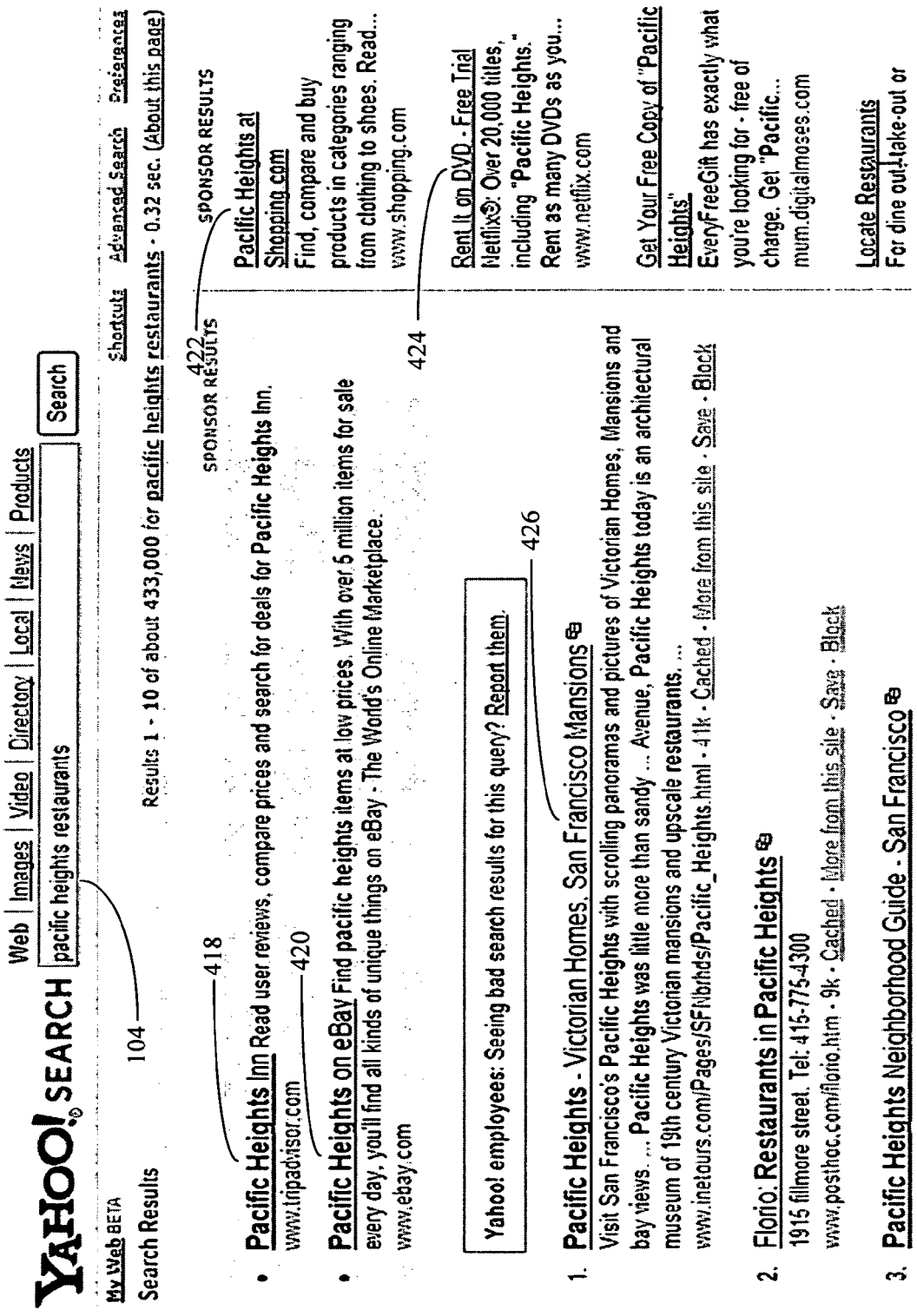
FIG. 8 is an illustration of an exemplary search results page performed without the geo-coding system of FIG. 1.
Figure 9:
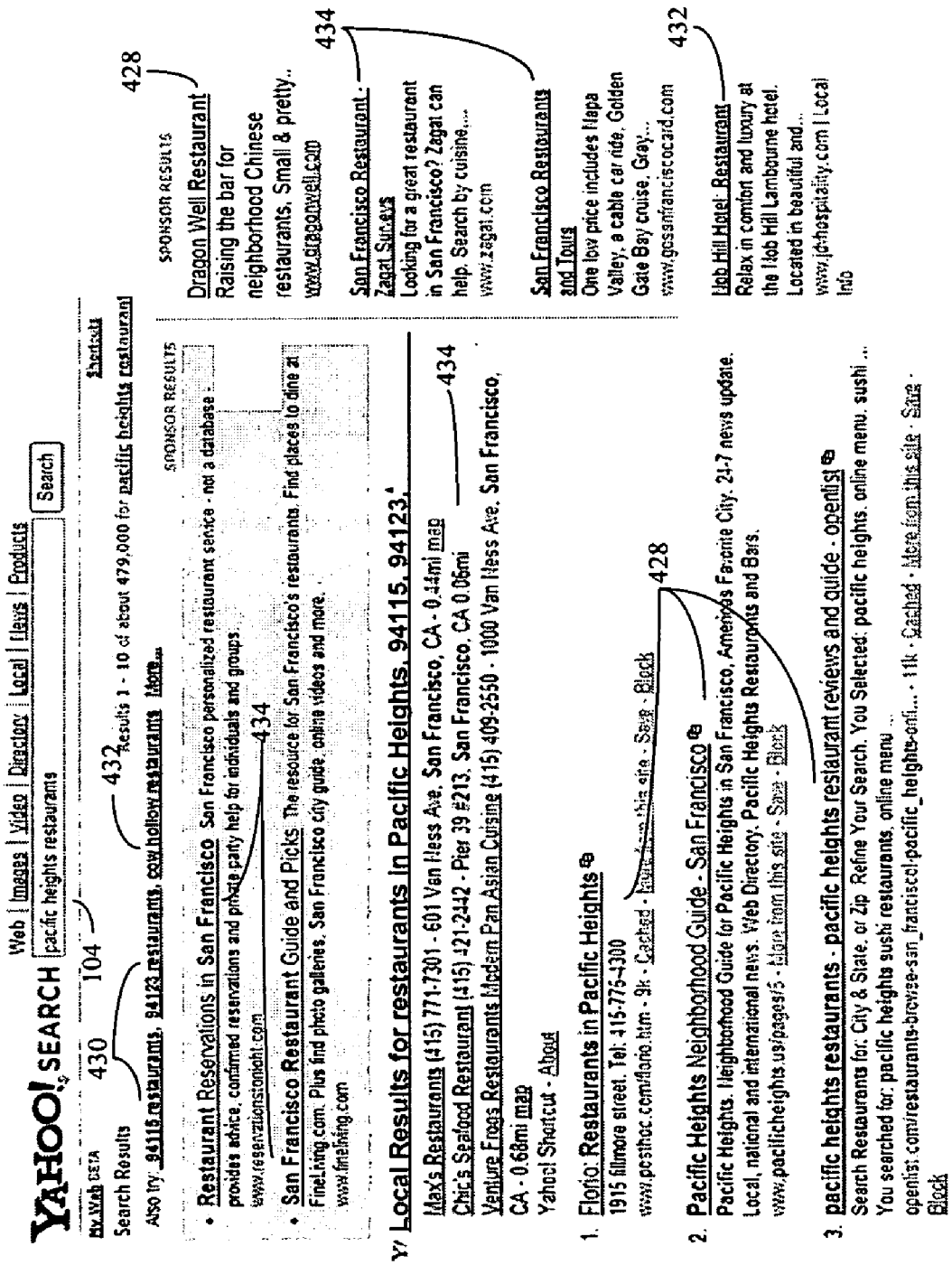
FIG. 9 is an illustration of an exemplary search results page performed with the geo-coding system of FIG. 1.
Figure 10:
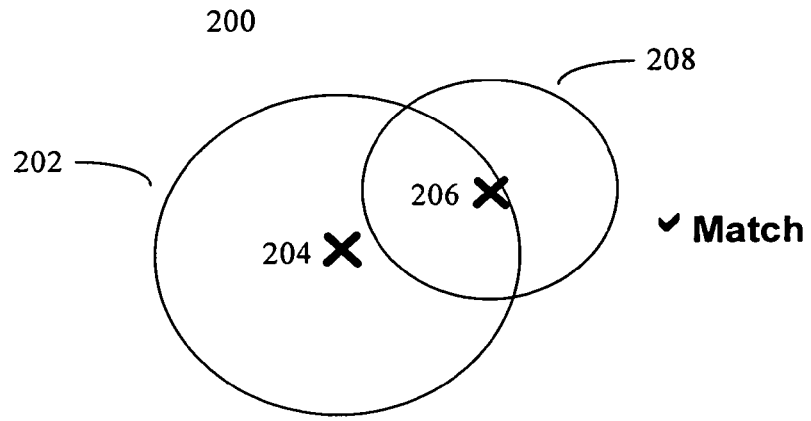
FIG. 10 is an illustration of an exemplary traditional matching method.
Figure 10:
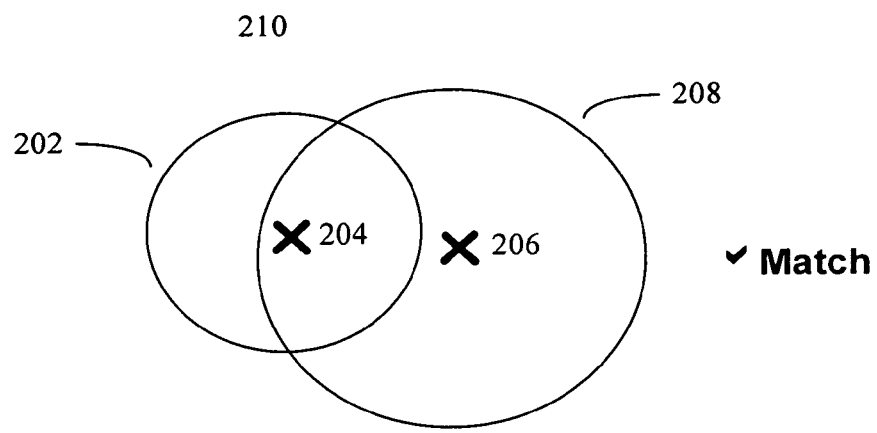
Figure 10:
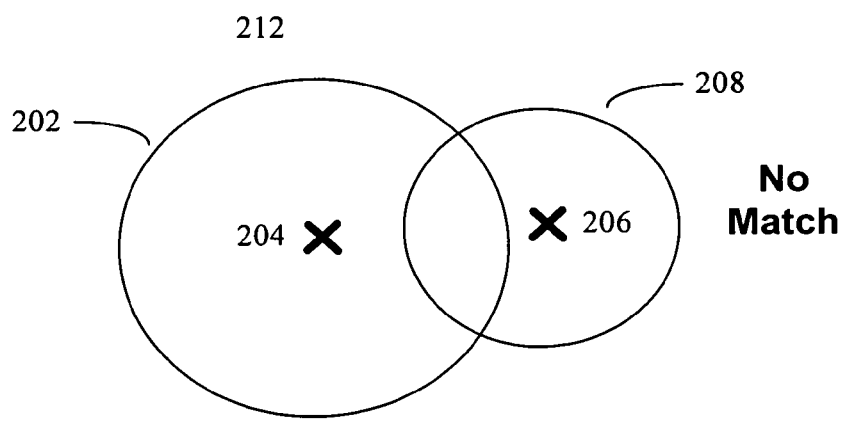

Comparing the search results of FIG. 8 and 9 demonstrate the effects of the geo-coding system 100. In both figures, the data item 104 is entered as a search query. The user is searching the web for "pacific heights restaurants." In other words, the user is searching for restaurants in the geographic location of Pacific Heights. However, the results of FIG. 7 demonstrate that the traditional geo-coding processors are unable to differentiate the context (restaurants) from the geography (Pacific Heights). Rather, the results in FIG. 7 are a direct result of text matching the query terms. As a result, the user is shown Pacific Heights Inn 418, Pacific Heights on Ebay 420, the DVD titled Pacific Heights 424, San Francisco's Pacific Heights 426 and Pacific Heights at Shopping.com 422. Clearly these results are not helpful to the user searching for restaurants in Pacific Heights.

Introducing the geo-coding system 100 yields much more relevant results to the user, as demonstrated in FIG. 8. The data item 104 is "pacific heights restaurants." The data item 104 is input into the identifying processor 106. The identifying processor 106 identifies the components 108 of "pacific heights restaurants." In this case, the query search is unstructured data, thus the identifying processor 106 may use algorithms to determine which components 108 of "pacific heights restaurants" have geographical relevance, which is discussed above. Once the identifying processor 106 determines that Pacific Heights has geographical relevance, the identifying processor 106 treats "pacific heights" as a geographical component 108.

The geographical component 108 may then be input into the associating processor 110. The associating processor 110 associates Pacific Heights with a geographic region 112. Using the geographical database of polygons discussed above, the associating processor 110 may identify Pacific Heights in the database and thus locate the polygon representing Pacific Heights. If there are several polygons representing the component Pacific Heights, then the associating processor 110 may disambiguate between the geographical regions to determine which Pacific Heights the user intends. This disambiguation process is discussed above.

The geographic region 112 may then be input into the determining processor 114. The determining processor 114 determines at least two points 116 that correspond to the polygon representing Pacific Heights. The two points 116 may then be used to construct a minimum bounded rectangle that encloses the polygon, if a minimum bounding rectangle does not already exist.

The minimum bounding rectangle may then be input into the augmenting processor 118. The augmenting processor 118 augments the data item 104 with the data representative of the minimum bounding rectangle. The data may contain the text name of the component 108, the polygon identifier, the minimum bounding rectangle identifier and any characteristic or attributes associated with the polygon. The system 100 outputs the data item 104 augmented with this information.

Thus, the data item "pacific heights restaurants" may be associated with the minimum bounding rectangle that encloses Pacific Heights. This geographical region, along with its parent/child and adjacent regions may now be searched for restaurants. The results therefore reflect the user's intended search of restaurants within Pacific Heights. As shown in FIG. 8, the results show a restaurant located in the Pacific Heights neighborhood 428, restaurants from the child region zip codes of Pacific Heights 430, restaurants from adjacent neighborhoods of Pacific Heights 432, and restaurants from the parent city of San Francisco 434.

In the past, advertisers attempted to mimic these results by buying thousands of key words. A restaurateur in Pacific Heights had to buy every geographic term relating to the location of the restaurant. When that term is searched by a user, the advertisement or result would be displayed.

Advertisers may also purchase regions to advertise, but these regions were represented by circles. It was easy for an advertiser to define a center point and then a specified radius would form the circle. If a user ventured into that circle while searching then. the advertisement was served. However, there are several drawbacks to using the circle/radius calculations.

As shown in FIG. 9, a match is only determined if the center point falls within the circle. It is too resource intensive to analyze every point along both circles to determine if the circles overlap. Thus, if for example, a user is searching for dentists in Pasadena, Calif. then a center point 204 in Pasadena and a designated radius forms a circle 202 around Pasadena. A dentist located in neighboring Altadena, Calif. may have a similar circle 208 formed around Altadena. If one of the center points is not enclosed by the other circle then no match is found. Thus, even if the dentist in Altadena serves patients in Pasadena, the user in Pasadena may be unable to see the dentist's advertisement. The user would either have to broaden the search or the dentist would have to purchase a larger circle or buy more key words.

Other drawbacks of using the traditional circle/radius method include the inadequate representation of the often jagged, uneven boundaries of geographic features. It may be difficult if not impossible to use circles to represent these geographical features. Another drawback may be that advertisers will often purchase large circles in order to target large areas. These circles encompass much area that the advertiser is unable or unwilling to serve. For example, a real estate agent serving Los Angeles, Calif. might purchase a large circle encompassing all of Los Angeles. However, the circle might also encompass Oakland, Calif. Users in Oakland may be served the ad when the real estate business may not want them to. Thus the advertiser pays for clicks or calls from users that the advertisers cannot serve.

Despite these drawbacks, the circles may still be used as a selection tool to select geographical areas to advertise. The system 100 may still recognize the circles; however, the system 100 may identify the polygons that make up the circles. For example, the associating processor 110 may identify all the polygons representing the zip codes that make up the circle region. In this regard, minimum bounding rectangles may be constructed to overcome the drawbacks of the circles. With minimum bounding rectangles, only the two points that define the minimum bounding rectangles need to be analyzed. It may therefore be simple to determine the relationship between two or more minimum bounding rectangles.

In the example above, after passing through the geo-coding system 100, the user's search for a Pasadena dentist may yield a data item 104 augmented with geographic information associated with Pasadena, Calif. From this information, it may readily be determined from the polygon or minimum bounding rectangle identifier that Altadena, Calif. is adjacent to Pasadena, Calif. As such, the dentist's advertisement from Altadena may be served to the user.

Even if it may not be determined from the geographic data that two or more regions are adjacent, it may still be calculated using the minimum bounding rectangles. The same is true if it may not be determined that two or more regions are overlapping, such as in a parent/child relationship. In both of these cases, using the two points that define the minimum bounding rectangle, overlap and adjacencies may be determined.

If the minimum bounding rectangles were not constructed over the polygons representing the respective regions then this calculation would be almost impossible. To calculate the vast number of line segments that make up these polygons is extremely resource intensive. However, with minimum bounding rectangles, there are only two points that need to be analyzed.

The geo-coding system 100 may allow search engines to provide users with geographically relevant information based on the user's search query. In addition to formal addresses, locations and geographical regions, the geo-coding system 100 allows informal addresses to be searched, analyzed and geo-coded. For example, informal areas such as colloquial or tourists areas, which may not be part of an official address structure, may be geo-coded by the system 100. Geographic areas such as Bay Area, Silicon Valley, Big Apple, Windy City and Wall Street may be searched by a user and geo-coded. As such, an address of Sunnyvale, Silicon Valley, Calif. would work in the geo-coding system 100, whereas it would cause difficulties for the simple lookup tables traditionally used in geo-coding systems.

The geo-coding system 100, with the use of minimum bounding rectangles, is quick and efficient with resources. As stated above, only two points per minimum bounding rectangle need to be analyzed to determine its relation with other minimum bounding rectangles. As such, geo-relevant information, advertisements and media may be quickly and efficiently provided to a user.

The geo-coding system 100 also allows for discrepancies between user perceptions of a location as compared to the official post office address definition of the location. For example, the official post office address may define a suburb as part of exactly one city. However, the suburb may actually border two cities. With the geo-coding system 100, the suburb may be geo-coded in reference to either city. The traditional lookup table methods of geo-coding may be confined to the official post office address, where only one city may be associated with a suburb.

The geo-coding system 100 may allow search engines to match users with geographically relevant information, advertisements and media. The geo-coding system 100 may distinguish the data that has geographical relevance from data that does not. Thus a search for "Pacific Height restaurants" will result in a search for restaurants within the geographical region of Pacific Heights, Calif. The geo-coding system 100 may not be limited to the traditional text matching methods.

The geo-coding system 100 may allow businesses to target users with geographically relevant information, advertisements and media. Cellular phones, personal digital assistants, vehicle navigation systems or other personal computing devices may be tagged with a unique identifier which is then stored in the geographic database 128. Thus, when a user moves in and out of geographic regions with such portable device, geo-relevant information, advertisements and media may be provided the user. Radio frequency identification devices placed under the skin, or elsewhere on a user, within a card, such as a smart card, or other device may similarly be tagged. Credit cards may be tagged so that when a credit card is used, an advertisement may be displayed on the cash register for a local business. Publicly provided web services may be tagged so that once a user logs in the user is provided with geo-relevant information, advertisements and media. A business supplying internet may allow its routers to be tagged so that when a user accesses the services, other local businesses may advertise to the user.

With the geo-coding systems 100 capability of determining adjacent geographic regions, a user traveling may have geo-relevant information, advertisements and media provided before the user enters the geographic region.

Using other user identification means, such as a user's internet protocol, the geo-coding system 100 may determine where the user's query location is. A business may be able to send geo-relevant information, advertisements and media to a user depending on where the user is located. For example, a hotel chain may advertise Hawaii vacations online to users on the west coast as weekend vacations whereas the same hotel chain may advertise week long advertisements to users on the east coast.

The geo-coding system 100 may also construct a minimum bounding rectangle around a building, sports arena or the like. Thus a user would be able to search for attributes within a certain building. For example, a user could search for law firms or other businesses within the Sears Tower. Yankee Stadium could have its own minimum bounding rectangle so that users may search for local restaurants or businesses near the ballpark.

The illustrations of the embodiments described herein are intended to provide a general understanding of the structure of the various embodiments. The illustrations are not intended to serve as a complete description of all of the elements and features of apparatus and processors that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

We claim:

1. A system implemented method of providing geo-relevant information based on a geographic location, the method comprising:
   receiving, by a processor, a data item from an electronic device, the data item originating from a geographic location and comprising at least one component characterized by the geographic location;
   geo-coding, by the processor, the data item, wherein the geo-coding further includes:
      identifying, by the processor, the at least one component;
      associating, by the processor the identified at least one component with a first geographic region;
      determining, by the processor a first group of at least two points corresponding to the geographic region, the first group of at least two points defining a plane in which the first geographic region lies; and
      augmenting, by the processor, the data item with data representative of the determined first group of at least two points defining a plane; and
   wherein the method further comprises:
      determining, by the processor, relevant information based on the augmented data item; and
      providing, by the processor, the relevant information to a user.

2. The method of claim 1, wherein the geographic location comprises a geographic location of the user.

3. The method of claim 1, wherein the receiving further comprises receiving, by the processor, the data item indirectly.

4. The method of claim 1, wherein the data representative of the determined first group of at least two points defining a plane comprises a first data record, the first data record comprising an identifier of the first geographic region and the determined first group of at least two points corresponding thereto.

5. The method of claim 4, wherein the determining relevant information further comprises:
   identifying, by the processor, a second data record in a geo-coded database representative of a second geographic region one of adjacent to, proximate to, overlapping with, within or encompassing the first geographic region; and
   associating, by the processor, the second data record with the first data record in the geo-coded database.

6. The method of claim 1, wherein the providing further comprises displaying the relevant information on the electronic device having a display viewable by the user.

7. The method of claim 1, wherein the first group of at least two points defining a plane comprises a minimum bounding rectangle enclosing a polygon representative of the geographic region.

8. The method of claim 7, wherein the determining, by the processor, relevant information further comprises determining, by the processor, when the user moves in and out of the minimum bounding rectangle representative of the geographic region and wherein the providing further comprises providing, by the processor, information corresponding to the minimum bounding rectangle in which the user is located.

9. The method of claim 1, wherein the data item comprises a plurality of separate data items and wherein the receiving further comprises receiving, by the processor, one or more of the plurality of separate data items, from the electronic device, separately over a period of time, from different locations, or combinations thereof.

10. A system for providing geo-relevant information based on a received data item originating from a geographic location, the received data item comprising at least one component characterized by the geographic region, the system comprising:

a geo-coding processor operative to geo-code the received data item originating from a geographic location, the geo-coding processor further including:
an identifying processor operative to identify the at least one component;
an associating processor coupled with the identifying processor and operative to associate the identified at least one component with a first geographic region;
a determining processor coupled with the associating processor and operative to determine a first group of at least two points corresponding to the first geographic region, the first group of at least two points defining a plane in which the first geographic region lies; and
an augmenting processor coupled with the determining processor and operative to augment the data item with data representative of the determined first group of at least two points defining a plane; and
wherein the system further comprises:
a relevance processor coupled with the geo-coding processor and operative to determine relevant information based on the augmented data item; and
a communications processor coupled with the relevance processor and operative to provide the relevant information to a user.

11. The system of claim 10, wherein the geographic location comprises a geographic location of the user.

12. The system of claim 10, wherein the received data item further comprises an indirectly received data item.

13. The system of claim 10, wherein the data representative of the determined first group of at least two points defining a plane comprises a first data record, the first data record comprising an identifier of the first geographic region and the determined first group of at least two points corresponding thereto.

14. The system of claim 13, wherein the relevance processor is further operative to identify a second data record in a geo-coded database representative of a second geographic region one of adjacent to, proximate to, overlapping with, within or encompassing the first geographic region, and associate the second data record with the first data record in the geo-coded database.

15. The system of claim 10, wherein the communications processor is further operative to display the relevant information on an electronic device having a display viewable by the user.

16. The system of claim 10, wherein the first group of at least two points defining a plane comprises a minimum bounding rectangle enclosing a polygon representative of the geographic region.

17. The system of claim 16, wherein the relevance processor is further operative to determine when the user moves in and out of the minimum bounding rectangle representative of the geographic region and wherein the communications processor is further operative to provide information corresponding to the minimum bounding rectangle in which the user is located.

18. The system of claim 10, wherein the received data item comprises a plurality of separately received data items and wherein the received data item further comprises one or more of the plurality of separately received data items separately over a period of time, from different locations, or combinations thereof.

19. A system for providing geo-relevant information based on a location, the system comprising:

means for receiving a data item, the data item originating from a geographic location and comprising at least one component characterized by the geographic location;
means for geo-coding the data item coupled with the means for receiving, wherein the means for geo-coding further includes:
means for identifying the at least one component;
means, coupled with the means for identifying, for associating the identified at least one component with a geographic region;
means, coupled with the means for associating, for determining at least one group of at least two points corresponding to the geographic region, the at least one group of at least two points defining a plane in which the geographic region lies; and
means, coupled with the means for determining, for augmenting the data item with data representative of the determined at least one group of at least two points defining a plane; and
wherein the system further comprises:
means, coupled with the means for geo-coding, for determining relevant information based on the augmented data item; and
means, coupled with the means for determining, for providing the relevant information to a user.

* * * * *

UNITED STATES PATENT AND TRADEMARK OFFICE
CERTIFICATE OF CORRECTION

PATENT NO. : 7,606,581 B2  
APPLICATION NO. : 11/314155  
DATED : October 20, 2009  
INVENTOR(S) : Riise et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 758 days.

Signed and Sealed this

Twelfth Day of October, 2010

David J. Kappos  
*Director of the United States Patent and Trademark Office*